(12) United States Patent
Wang et al.

(10) Patent No.: US 10,938,812 B2
(45) Date of Patent: Mar. 2, 2021

(54) IDENTITY VERIFICATION METHOD AND APPARATUS

(71) Applicant: ADVANCED NEW TECHNOLOGIES CO., LTD., Grand Cayman (KY)

(72) Inventors: Wei Wang, Hangzhou (CN); Xiuli Zhao, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/884,526

(22) Filed: May 27, 2020

(65) Prior Publication Data

US 2020/0287900 A1 Sep. 10, 2020

Related U.S. Application Data

(63) Continuation of application No. PCT/CN2019/077129, filed on Mar. 6, 2019.

(30) Foreign Application Priority Data

May 28, 2018 (CN) .......................... 201810525345.7

(51) Int. Cl.
*H04L 29/06* (2006.01)
*G06N 20/00* (2019.01)

(52) U.S. Cl.
CPC ........ *H04L 63/0876* (2013.01); *H04L 63/205* (2013.01); *G06N 20/00* (2019.01); *H04L 63/083* (2013.01); *H04L 63/0861* (2013.01)

(58) Field of Classification Search
CPC ............... H04L 63/083; H04L 63/0853; H04L 63/0861; H04L 63/0876; H04L 63/205; G06F 21/55; G06F 21/554; G06N 20/00
See application file for complete search history.

(56) References Cited

U.S. PATENT DOCUMENTS 7,996,669 B2 8/2011 Pearson et al.
8,176,189 B2 5/2012 Traversat et al.
(Continued)

FOREIGN PATENT DOCUMENTS

CN 102387135 A 3/2012
CN 103596173 A 2/2014
(Continued)

OTHER PUBLICATIONS

International Search Report and Written Opinion for Application No. PCT/CN2019/077129, dated May 30, 2019, 9 pages.
(Continued)

*Primary Examiner* — Minh Dinh

(57) ABSTRACT

Systems, methods, and storage media for identity verification are disclosed. An example of an identity verification method comprises: receiving from a computing device an identity verification request for identity verification of a user of the computing device for accessing a service system, wherein the identity verification request comprises device environment information of the computing device; determining a credibility of the computing device according to (i) the device environment information of the computing device and (ii) historical feature information comprising device environment information of a historical device used by the user, wherein the historical device previously logged into the service system or underwent a previous identity verification for accessing the service system; determining, according to the credibility of the computing device, an identity verification policy for performing identity verification on the user; and performing identity verification on the user according to the identity verification policy.

19 Claims, 7 Drawing Sheets

(56) References Cited

U.S. PATENT DOCUMENTS

| | | |
|---|---|---|
| 8,468,244 B2 | 6/2013 | Redlich et al. |
| 8,881,257 B2 | 11/2014 | Cha et al. |
| 9,292,793 B1* | 3/2016 | Lin .................... H04L 63/0876 |
| 9,426,139 B1 | 8/2016 | Mcclintock et al. |
| 9,537,650 B2 | 1/2017 | Auradkar et al. |
| 9,807,092 B1* | 10/2017 | Gutzmann .............. H04L 63/10 |
| 9,870,477 B2 | 1/2018 | Aissi et al. |
| 9,906,519 B1* | 2/2018 | Kotamraju ............ H04L 63/083 |
| 10,057,227 B1* | 8/2018 | Hess ....................... G06F 21/31 |
| 2011/0010761 A1 | 1/2011 | Doyle |
| 2013/0339232 A1 | 12/2013 | Desai et al. |
| 2014/0020068 A1 | 1/2014 | Desai et al. |
| 2014/0089113 A1 | 3/2014 | Desai et al. |
| 2014/0289790 A1* | 9/2014 | Wilson .............. G06Q 20/4012 726/1 |
| 2014/0298419 A1 | 10/2014 | Boubez et al. |
| 2015/0302413 A1 | 10/2015 | Dua |
| 2016/0119316 A1 | 4/2016 | Liu |
| 2016/0180068 A1 | 6/2016 | Das et al. |
| 2016/0255078 A1 | 9/2016 | Zhang et al. |
| 2016/0275461 A1 | 9/2016 | Sprague et al. |
| 2017/0206523 A1 | 7/2017 | Goeringer et al. |
| 2018/0041345 A1 | 2/2018 | Maim |
| 2018/0117446 A1 | 5/2018 | Tran et al. |
| 2018/0130061 A1 | 5/2018 | Caldera |

FOREIGN PATENT DOCUMENTS

| | | |
|---|---|---|
| CN | 104144419 A | 11/2014 |
| CN | 104301117 A | 1/2015 |
| CN | 104462215 A | 3/2015 |
| CN | 104933351 A | 9/2015 |
| CN | 106936806 A | 7/2017 |
| CN | 107743112 A | 2/2018 |
| CN | 107749844 A | 3/2018 |
| CN | 107872433 A | 4/2018 |
| CN | 107872436 A | 4/2018 |
| CN | 108076018 A | 5/2018 |
| CN | 108875327 A | 11/2018 |
| TW | 201110642 A | 3/2011 |

OTHER PUBLICATIONS

First Search Report for Chinese Application No. 201810525345.7 dated Feb. 25, 2020.
Office Action for Chinese Application No. 201810525345.7 dated Mar. 3, 2020.
Supplementary Search Report for Chinese Application No. 201810525345.7 dated Apr. 24, 2020.
Second Office Action for Chinese Application No. 201810525345.7 dated May 6, 2020.
Search Report for Taiwanese Application No. 108106152 dated May 11, 2020.
Liu et al., "Research on Transcriptional Regulatory Network Based on Combined Model", CNKI, Jun. 9, 2017. [English Abstract Provided].
Written Opinion and Search Report for Singaporean Application No. 11202006026X, dated Dec. 29, 2020, 8 pages.

* cited by examiner

US 10,938,812 B2

IDENTITY VERIFICATION METHOD AND APPARATUS

CROSS REFERENCE TO RELATED APPLICATIONS

The present application is a continuation application of PCT Application No. PCT/CN2019/077129 filed Mar. 6, 2019, which is based on and claims priority to Chinese Patent Application No. 201810525345.7, filed on May 28, 2018. All of the above-identified applications are incorporated herein by reference in their entirety.

TECHNICAL FIELD

The present application relates to the field of computer technologies, and in particular, to an identity verification method and apparatus.

BACKGROUND

With the popularity of the mobile Internet and the development of mobile payment services, more users use smart terminals for operations such as online shopping and payment.

In order to protect security of user services and resources, when a user logs into a system or participates in the service, an identity of the user usually needs to be verified to determine whether the user requesting to log into the system or participate in the service has a corresponding authorization, that is, determine whether the user logging into the system is the real user. Therefore, relatively high requirements are imposed on security and reliability of identity verification.

Therefore, an identity verification method helping improve the security and the reliability of identity verification and satisfying usage requirements of a user is urgently required.

SUMMARY

Embodiments of the present application provide an identity verification method and apparatus to improve security and reliability of identity verification and satisfy usage requirements of a user.

The embodiments of the present application adopt the following technical solutions.

In some embodiments, an identity verification method includes: receiving an identity verification request from a to-be-verified device, where the identity verification request includes device environment information of the to-be-verified device, and is used for requesting identity verification of a user corresponding to the to-be-verified device; determining a credibility of the to-be-verified device according to historical feature information and the device environment information, where the historical feature information includes device environment information of a historical device; and determining, according to the credibility of the to-be-verified device, an identity verification policy for performing identity verification on the user, so as to perform identity verification according to the identity verification policy.

Optionally, in the identity verification method provided in the first aspect, the determining a credibility of the to-be-verified device according to historical feature information and the device environment information includes: determining a feature vector corresponding to the to-be-verified device according to the device environment information when a type of information included in the device environment information matches a preset information type; and inputting the feature vector to a device verification model, and determining the credibility of the to-be-verified device by using the device verification model, where the device verification model is configured to determine, based on device environment information of a device, a credibility label of a device that sends an identity verification request and a probability that the identity verification request is predicted as a credible request.

Optionally, in the identity verification method provided in the first aspect, before the inputting the feature vector to a device verification model, and determining the credibility of the to-be-verified device by using the device verification model, the method further includes: obtaining historical feature information corresponding to the historical device; determining, according to a time interval corresponding to the historical feature information, a training set comprising first historical feature information and a verification set comprising second historical feature information; and training the device verification model by using the first historical feature information, and verifying the device verification model by using the second historical feature information.

Optionally, in the identity verification method provided in the first aspect, the determining, according to a time interval corresponding to the historical feature information, a training set comprising first historical feature information and a verification set comprising second historical feature information includes: according to the time interval corresponding to the historical feature information, assigning first historical feature information generated at an earlier moment to the training set, and assigning second historical feature information generated at a later moment to the verification set.

Optionally, in the identity verification method provided in the first aspect, the device verification model includes a logistic regression LR model and an extreme gradient boosting XGBoost model, where the training the device verification model by using the first historical feature information includes: determining, according to the first historical feature information, a first historical feature vector, a second historical feature vector, and a first credibility label of a historical device corresponding to the first historical feature information; inputting the first historical feature vector to the logistic regression LR model; adjusting a model parameter of the logistic regression LR model according to the first credibility label and a first target label output by the logistic regression LR model until output of the logistic regression LR model satisfies a preset condition; calculating, according to output of a trained logistic regression LR model, a first probability that an identity verification request sent by the device corresponding to the first historical feature information is predicted as a credible request; inputting the first probability and the second historical feature vector to the extreme gradient boosting XGBoost model; and adjusting a model parameter of the extreme gradient boosting XGBoost model by using output of the extreme gradient boosting XGBoost model and the first credibility label until the output of the extreme gradient boosting XGBoost model satisfies a preset condition, where the output of the extreme gradient boosting XGBoost model includes the credibility label of the historical device corresponding to the first historical feature information and a probability that an identity verification request sent by the historical device is predicted as a credible request.

Optionally, in the identity verification method provided in the first aspect, the verifying the device verification model by using the second historical feature information includes: determining, according to the second historical feature information, a third historical feature vector, a fourth historical feature vector, and a second credibility label of a historical device corresponding to the second historical feature information; inputting the third historical feature vector to the trained logistic regression LR model; calculating, according to the output of the trained logistic regression LR model, a second probability that an identity verification request sent by the device corresponding to the second historical feature information is predicted as a credible request; inputting the second probability and the fourth historical feature vector to a trained extreme gradient boosting XGBoost model, and obtaining output of the device verification model by using the trained extreme gradient boosting XGBoost model, where the output of the device verification model includes the credibility label of the historical device corresponding to the second historical feature information and a third probability that an identity verification request sent by the historical device is predicted as a credible request; obtaining evaluation data of the device verification model by using a binary classification method according to the output of the device verification model and the second credibility label; and adjusting the model parameter of the logistic regression LR model and/or the extreme gradient boosting XGBoost model according to the evaluation data until the evaluation data of the device verification model satisfies a preset condition.

Optionally, in the identity verification method provided in the first aspect, the evaluation data of the device verification model includes at least one of an F1 score and an area under the curve AUC value.

Optionally, in the identity verification method provided in the first aspect, the model parameter of the logistic regression LR model includes at least one of a regularization term, a regularization coefficient, and a maximum iteration number.

Optionally, in the identity verification method provided in the first aspect, a number of components in the first historical feature vector is greater than a number of components in the second historical feature vector.

Optionally, in the identity verification method provided in the first aspect, the historical device includes at least one of a historical login device and a historical identity verification device.

Optionally, in the identity verification method provided in the first aspect, the determining a credibility of the to-be-verified device according to historical feature information and the device environment information includes: determining that the to-be-verified device is incredible when the type of the information included in the device environment information does not match the preset information type.

Optionally, in the identity verification method provided in the first aspect, the preset information type includes at least one of an identity ID of a device, and a wireless connection (Wi-Fi), a location-based service LBS, and an Internet Protocol IP address corresponding to the device.

Optionally, in the identity verification method provided in the first aspect, the determining, according to the credibility of the to-be-verified device, an identity verification policy for performing identity verification on the user includes: determining, according to the credibility of the to-be-verified device and a correspondence between an identity verification policy and a credibility interval, the identity verification policy for performing identity verification on the user, where a risk level matching the identity verification policy is in a negative relationship with a credibility of a user-held device.

Optionally, in the identity verification method provided in the first aspect, the identity verification policy includes at least one of an identity verification information type, an identity verification information amount, and an identity verification threshold range, wherein the risk level matching the identity verification policy being in a negative relationship with the credibility of the user-held device includes at least one of the following: when the identity verification policy includes the identity verification information type, a security level of the identity verification information type in the identity verification policy is in a negative relationship with the credibility of the user-held device; when the identity verification policy includes the identity verification information amount, the identity verification information amount in the identity verification policy is in a negative relationship with the credibility of the user-held device; and when the identity verification policy includes the identity verification threshold range, the identity verification threshold range in the identity verification policy is in a positive relationship with the credibility of the user-held device.

Optionally, in the identity verification method provided in the first aspect, performing identity verification according to the identity verification policy includes: determining, according to the identity verification policy, an identity verification process, information required for the identity verification, and an identity verification threshold range of the information required for the identity verification; prompting, according to the identity verification process, the to-be-verified device to report the information required for the identity verification; and when the information required for the identity verification is received from the to-be-verified device, performing the identity verification according to the identity verification threshold range of the information required for the identity verification.

In some embodiments, an identity verification apparatus includes: a request receiving module configured to receive an identity verification request from a to-be-verified device, where the identity verification request includes device environment information of the to-be-verified device, and is used for requesting identity verification of a user corresponding to the to-be-verified device; a credibility determining module configured to determine credibility of the to-be-verified device according to historical feature information and the device environment information, where the historical feature information includes device environment information of a historical device; and an identity verification policy determining module configured to determine, according to the credibility of the to-be-verified device, an identity verification policy for performing identity verification on the user, so as to perform identity verification according to the identity verification policy.

In some embodiments, an electronic device includes: a processor; and a memory configured to store a computer executable instruction that when executed, causes the processor to perform the following operations: receiving an identity verification request from a to-be-verified device, where the identity verification request includes device environment information of the to-be-verified device, and is used for requesting identity verification of a user corresponding to the to-be-verified device; determining a credibility of the to-be-verified device according to historical feature information and the device environment information, where the historical feature information includes device environment information of a historical device; and determining, according to the credibility of the to-be-verified device, an identity verification policy for performing identity verification on the user, so as to perform identity verification according to the identity verification policy.

In some embodiments, an computer readable storage medium stores one or more programs that, when executed by an electronic device including a plurality of applications, cause the electronic device to perform the following operations: receiving an identity verification request from a to-be-verified device, where the identity verification request includes device environment information of the to-be-verified device, and is used for requesting identity verification of a user corresponding to the to-be-verified device; determining a credibility of the to-be-verified device according to historical feature information and the device environment information, where the historical feature information includes device environment information of a historical device; and determining, according to the credibility of the to-be-verified device, an identity verification policy for performing identity verification on the user, so as to perform identity verification according to the identity verification policy.

In some embodiments, an identity verification method comprises: receiving from a computing device an identity verification request for identity verification of a user of the computing device for accessing a service system, wherein the identity verification request comprises device environment information of the computing device, wherein the device environment information comprises one or more of: identity ID information, and WI-FI information, LBS (location-based service) information, and IP (Internet Protocol IP) address; determining a credibility of the computing device according to (i) the device environment information of the computing device and (ii) historical feature information comprising device environment information of a historical device used by the user, wherein the historical device previously logged into the service system or underwent a previous identity verification for accessing the service system; determining, according to the credibility of the computing device, an identity verification policy for performing identity verification on the user, wherein the identity verification policy comprises one or more of: an identity verification information type, an identity verification information amount, and an identity verification threshold range; and performing identity verification on the user according to the identity verification policy.

In some embodiments, determining the credibility of the computing device comprises: determining a feature vector corresponding to the computing device according to the device environment information of the computing device when a type of information comprised in the device environment information matches a preset information type; inputting the feature vector to a device verification model; and outputting, from the device verification model based on device environment information of a device, a credibility label of the computing device and a probability that the identity verification request is a credible request.

In some embodiments, before inputting the feature vector to the device verification model, the method further comprises: obtaining historical feature information corresponding to the historical device; determining, according to a time interval corresponding to the historical feature information, a training set comprising first historical feature information and a verification set comprising second historical feature information; and training the device verification model by using the first historical feature information, and verifying the device verification model by using the second historical feature information.

In some embodiments, an identity verification method comprises: determining, according to the time interval corresponding to the historical feature information, the training set comprising first historical feature information and the verification set comprising second historical feature information comprises: according to the time interval corresponding to the historical feature information, assigning first historical feature information generated at a first time point to the training set, and assigning second historical feature information generated at a second time point to the verification set, wherein the first time point is earlier in time than the second time point.

In some embodiments, the device verification model comprises a LR (logistic regression) model and an XGBoost (extreme gradient boosting) model, wherein training the device verification model comprises: determining, according to the first historical feature information, a first historical feature vector, a second historical feature vector, and a first credibility label of a historical device corresponding to the first historical feature information; inputting the first historical feature vector to the LR model; obtaining a trained LR model by adjusting a model parameter of the LR model according to the first credibility label and a first target label output by the LR model; determining, according to an output of the trained LR model, a first probability that an identity verification request sent by the device corresponding to the first historical feature information is a credible request; inputting the first probability and the second historical feature vector to the XGBoost model; and obtaining a trained XGBoost model by adjusting a model parameter of the XGBoost model based on an output of the XGBoost model and the first credibility label, wherein the output of the XGBoost model comprises the first credibility label of the historical device corresponding to the first historical feature information and a probability that an identity verification request sent by the historical device corresponding to the first historical feature information is a credible request.

In some embodiments, verifying the device verification model by using the second historical feature information comprises: determining, according to the second historical feature information, a third historical feature vector, a fourth historical feature vector, and a second credibility label of a historical device corresponding to the second historical feature information; inputting the third historical feature vector to the trained LR model; determining, according to the output of the trained LR model, a second probability that an identity verification request sent by the device corresponding to the second historical feature information is a credible request; inputting the second probability and the fourth historical feature vector to the trained XGBoost model, and obtaining an output of the device verification model by using the trained XGBoost model, wherein the output of the device verification model comprises the second credibility label of the historical device corresponding to the second historical feature information and a third probability that an identity verification request sent by the historical device is a credible request; obtaining evaluation data of the device verification model by using a binary classification method according to the output of the device verification model and the second credibility label; and adjusting the model parameter of the LR model and/or the model parameter of the XGBoost model according to the evaluation data until the evaluation data of the device verification model satisfies a preset condition.

In some embodiments, the evaluation data of the device verification model comprises at least one of an F1 score and an AUC (area under the curve) value.

In some embodiments, the model parameter of the LR model comprises at least one of: a regularization term, a regularization coefficient, and a maximum iteration number.

In some embodiments, a number of components in the first historical feature vector is greater than a number of components in the second historical feature vector.

In some embodiments, determining the credibility of the computing device comprises: determining that the computing device is incredible when the type of the information comprised in the device environment information does not match the preset information type.

In some embodiments, the preset information type comprises at least one of: an identity ID of a device, and a WI-FI connection, a LBS (location-based service), and an IP (Internet Protocol) address corresponding to the device.

In some embodiments, the historical device comprises at least one of: a historical login device and a historical identity verification device.

In some embodiments, determining, according to the credibility of the computing device, the identity verification policy comprises: determining, according to the credibility of the computing device and a correspondence between the identity verification policy and a credibility interval, the identity verification policy, wherein: a risk level matching the identity verification policy is in a negative relationship with the credibility of the computing device.

In some embodiments, when the identity verification policy comprises the identity verification information type, a security level of the identity verification information type in the identity verification policy is in a negative relationship with the credibility of the computing device; when the identity verification policy comprises the identity verification information amount, the identity verification information amount in the identity verification policy is in a negative relationship with the credibility of the computing device; and when the identity verification policy comprises the identity verification threshold range, the identity verification threshold range in the identity verification policy is in a positive relationship with the credibility of the computing device.

In some embodiments, performing the identity verification on the user according to the identity verification policy comprises: determining, according to the identity verification policy, an identity verification process, information required for the identity verification, and an identity verification threshold range of the information required for the identity verification; prompting, according to the identity verification process, the computing device to report the information required for the identity verification; receiving the information required for the identity verification from the computing device; and performing the identity verification according to the identity verification threshold range of the information required for the identity verification.

In some embodiments, a non-transitory computer-readable storage medium stores instructions executable by one or more processors, wherein execution of the instructions causes the one or more processors to perform operations comprising: receiving from a computing device an identity verification request for identity verification of a user of the computing device for accessing a service system, wherein the identity verification request comprises device environment information of the computing device, wherein the device environment information comprises one or more of: identity ID information, and WI-FI information, LBS (location-based service) information, and IP (Internet Protocol IP) address; determining a credibility of the computing device according to (i) the device environment information of the computing device and (ii) historical feature information comprising device environment information of a historical device used by the user, wherein the historical device previously logged into the service system or underwent a previous identity verification for accessing the service system; determining, according to the credibility of the computing device, an identity verification policy for performing identity verification on the user, wherein the identity verification policy comprises one or more of: an identity verification information type, an identity verification information amount, and an identity verification threshold range; and performing identity verification on the user according to the identity verification policy.

In some embodiments, a system comprises one or more processors and one or more non-transitory computer-readable storage media storing instructions executable by the one or more processors, wherein execution of the instructions causes the one or more processors to perform operations comprising: receiving from a computing device an identity verification request for identity verification of a user of the computing device for accessing the system, wherein the identity verification request comprises device environment information of the computing device, wherein the device environment information comprises one or more of: identity ID information, and WI-FI information, LBS (location-based service) information, and IP (Internet Protocol IP) address; determining a credibility of the computing device according to (i) the device environment information of the computing device and (ii) historical feature information comprising device environment information of a historical device used by the user, wherein the historical device previously logged into the system or underwent a previous identity verification for accessing the system; determining, according to the credibility of the computing device, an identity verification policy for performing identity verification on the user, wherein the identity verification policy comprises one or more of: an identity verification information type, an identity verification information amount, and an identity verification threshold range; and performing identity verification on the user according to the identity verification policy.

The at least one technical solution adopted in the embodiments of the present application can achieve the following beneficial effects. In the embodiments of the present application, after the verification request is received from the to-be-verified device, the verification is not directly performed, but the credibility of the to-be-verified device is determined according to the device environment information of the historical device and the device environment information of the to-be-verified device, and the identity verification policy for performing identity verification on the user is further determined according to the credibility. According to the method in the embodiments of the present application, without awareness of a user, an identity verification policy applicable to a currently user-held device can be selected for the user according to the credibility of the user-held device. Therefore, the embodiments of the present application facilitate improvements in the security and the reliability of identity verification, and can satisfy usage requirements of the user, and improve the user experience.

BRIEF DESCRIPTION OF THE DRAWINGS

The accompanying drawings described herein are used for providing further understanding for the present application and constitute a part of the present application. Exemplary embodiments of the present application and descriptions thereof are used for explaining the present application and do not constitute an improper limitation to the present application.

DETAILED DESCRIPTION OF THE INVENTION

Figure 1:
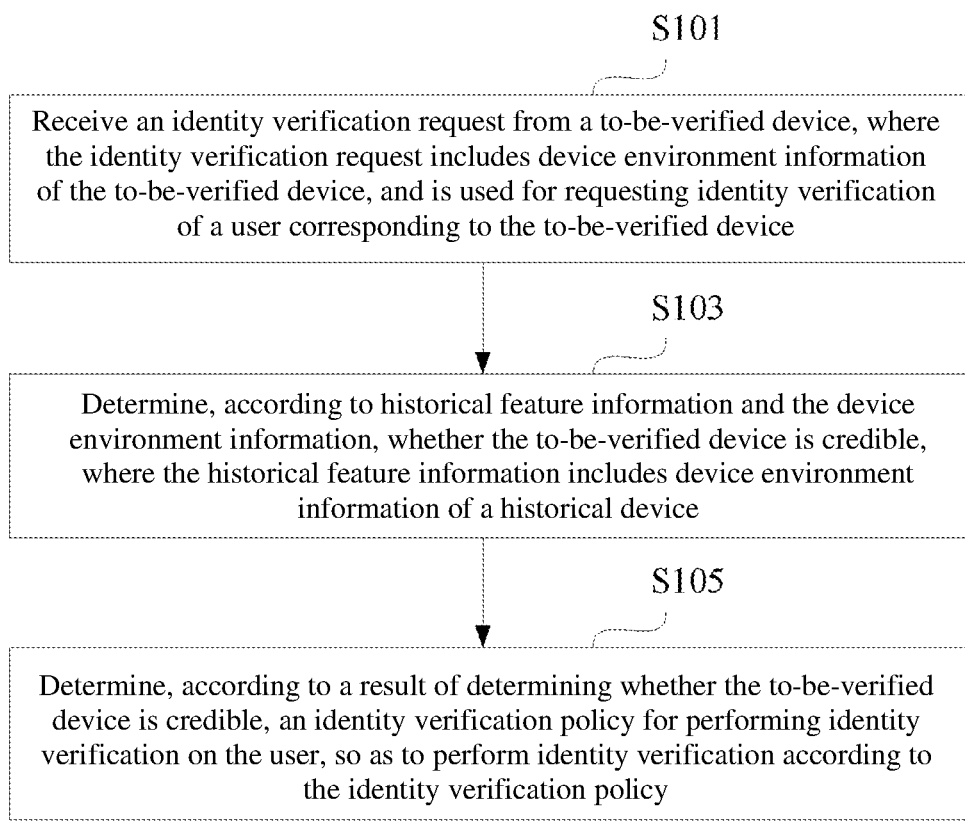
FIG. 1 is a schematic flowchart of an identity verification method, according to an embodiment of the present application.

In order to make the objects, technical solutions, and advantages of the present application clear, the technical solutions of the present application will be clearly and completely described below in the following with reference to the embodiments of the present application. It is obvious that the embodiments to be described are only some rather than all of the embodiments of the present application. All other embodiments obtained by a person of ordinary skill in the art based on the embodiments of the present application without creative efforts shall fall within the protection scope of the present application.

In the Internet era, regardless of the mobile Internet or a mobile payment service, an identity of a user accessing a network platform or using a service system needs to be verified, that is, identity checking or identity authentication needs to be performed to ensure security of the network platform and the service system, thereby ensuring that the user accessing the network platform or using the service system has legitimate authorization. During specific implementation, an identity verification system that implements an identity verification function may be either a dedicated identity verification system independent of the service system or a part of the service system.

During identity verification of a user, information (for example, a login password, a payment password, a fingerprint, etc.) input by the user applying for identity verification to the identity verification system may be compared to information stored in the backend of the identity verification system. When it is determined through comparison that the information satisfies a condition (for example, complete consistency or a deviation within a preset range, etc.), identity verification of the user applying identity verification may be considered to be successful and the user may be considered to have authorization to participate in a service.

Optionally, a biological recognition technology such as fingerprint recognition, face recognition, voiceprint recognition, iris recognition, etc. may be used for identity verification. During implementation, biological characteristics of the user applying for identity verification may be compared to biological characteristics stored in the backend, and an identity of the user may be verified according to a comparison result.

Optionally, text message code verification or security question verification may also be used for identity verification. During implementation, the identity verification system may provide a randomly generated text message verification code or a preset security question for the user applying for identity verification. After the identity verification system receives a text message code or an answer to the security question fed back by the user, the identity of the user may be verified through determining whether the answer of the user is consistent with a stored answer or a correct answer determined by the identity verification system.

With the improvement of technical levels, optimizing only one of the above aspects, for example, designing a longer, more complex, and more time-effective password to improve security of password verification, or improving bandwidth and server stability to ensure stability of sending a third-party password (for example, a text message verification code), thereby improving security and reliability of identity verification may have increasing marginal costs.

In order to improve the security and the reliability of identity verification and meet usage requirements of a user, an embodiment of the present application provides an identity verification method to be performed by the identity verification system. It may be understood that the identity verification system may be independent of the service system or may be used as a part of the service system to implement a function of verifying an identity of a user in a service process. In the verification method provided in this embodiment of the present application, auxiliary verification is performed by using device environment information to determine a potential risk of a user applying for identity verification. For example, a credibility of a device held by the user is determined according to device environment information of the user-held device and device environment information of a historical device, and an identity verification policy for performing identity verification on the user is further determined according to the credibility.

In some embodiments, a higher credibility of the terminal device indicates more reasonable and securer use of the mobile terminal by the user applying for identity verification. Therefore, a relatively moderate identity verification policy matching a relatively low risk level may be used to verify the identity of the user. Correspondingly, a lower credibility of the terminal device indicates less reasonable and less secure use of the mobile terminal by the user applying for identity verification. Therefore, a relatively strict identity verification policy matching a relatively high risk level needs to be used to verify the identity of the user.

It may be understood that the terminal device held by the user and the to-be-verified device in this embodiment of the present application may be a device such as a personal computer, or may be a mobile terminal device such as a smartphone or a tablet computer. The terminal device is used by the user for sending an identity verification request and applying for service participation.

According to the method in this embodiment of the present application, the device core information may be used for assisting identity verification sustainably without awareness of the user. Moreover, a strong verification manner such as biological characteristic verification, security question verification, etc. may be further used, and an identity verification policy suitable for the currently held device may be selected for the user based on a determined credibility of the user-held device. Optionally, a security verification level of the biological characteristic verification or security question verification may be appropriately adjusted according to the credibility of the device. For example, a higher credibility of the device may indicate a lower comparison threshold during face verification. For another example, a higher credibility of the device may indicate fewer questions during security question verification, and so on.

Therefore, in the embodiment of the present application, the device environment information is used to assist the identity verification, helping improve security and reliability of the identity verification. In addition, the identity verification policy may be selected according to the credibility of the device, so that user requirements of the user can be better satisfied and user experience can be improved.

The technical solutions provided in the embodiments of the present application are described in detail below with reference to the drawings.

Referring to FIG. 1, an embodiment of the present application provides an identity verification method that may be performed by an identity verification system. The method may include the following steps.

S101: Receive an identity verification request from a to-be-verified device, where the identity verification request includes device environment information of the to-be-verified device, and is used for requesting identity verification of a user corresponding to the to-be-verified device. For example, S101 may include receiving from a computing device an identity verification request for identity verification of a user of the computing device for accessing a service system, wherein the identity verification request comprises device environment information of the computing device, wherein the device environment information comprises one or more of: identity ID information, and WI-FI information, LBS (location-based service) information, and IP (Internet Protocol IP) address.

It may be understood that when a user wishes to log into a service system or to initiate a service request in the service system, identity verification usually needs to be performed first, that is, an identity of the user needs to be verified. The identity verification system executes the identity verification request received in step S101. The identity verification request may be a login request or a service request initiated by the user through a held terminal device, or may be an identity verification request dedicated to request identity verification on the user corresponding to the device.

Optionally, the device environment information of the to-be-verified device may include an identity ID of the to-be-verified device, an Internet Protocol (IP) address on a network to which the to-be-verified device is connected, etc. For a to-be-verified device connected to a mobile communication network or a wireless network, the device environment information of the to-be-verified device may further include a Wireless-Fidelity (Wi-Fi) connection, a location based service (LBS), etc.

It may be understood that when the to-be-verified device sends the identity verification request to the identity verification system, the to-be-verified device is certainly connected to the Internet or the mobile Internet. Therefore, the device environment information sent by the to-be-verified device to the identity verification system can reflect the identity of the to-be-verified device (embodied by a carried identity ID) and a network environment authorized to the user when applying for identity verification by using the to-be-verified device, which may be embodied by an IP address, Wi-Fi, an LBS, etc. corresponding to the device.

S103: Determine a credibility of the to-be-verified device according to historical feature information and the device environment information, where the historical feature information includes device environment information of a historical device. For example, S103 may include determining a credibility of the computing device according to (i) the device environment information of the computing device and (ii) historical feature information comprising device environment information of a historical device used by the user, wherein the historical device previously logged into the service system or underwent a previous identity verification for accessing the service system.

After the device environment information of the to-be-verified device is received, the identity verification system further performs step S103 of determining the credibility of the to-be-verified device by using the historical feature information including the device environment information of the to-be-verified device. It may be understood that a particular user usually corresponds to one or more frequently used terminal devices (for example, smartphones, tablet computers, wearable intelligent devices, laptops, etc.) and one or more network environments to which a connection is usually established (for example, a home network, an office network, a frequent shopping mall network, a restaurant network, etc.). These frequently used terminal devices and network environments to which a connection is frequently established may be embodied by the above historical feature information. Therefore, the identity verification system may determine the credibility of the to-be-verified device based on the historical feature information and the device environment information of the current device applying for identity verification. It may be determined by using the credibility whether applying by the particular user for identity verification through the to-be-verified device is reasonable and consistent with the routine.

The credibility of the to-be-verified device may be determined according to historical feature information and the device environment information in various manners and by using various specific standards. For example, the identity ID of the to-be-verified device may be compared to an identity ID of the historical device in the historical feature information. If the identities are the same, it may be considered that the to-be-verified device is more likely to be credible. For another example, matching may be performed between a network environment to which the to-be-verified device is connected and a network environment to which the historical device is connected in the historical feature information. If the network environments match each other (for example, the to-be-verified device and the historical device are connected to the same Wi-Fi), it may be considered that the to-be-verified device is more likely to be credible. For still another example, matching may be performed between location information of the to-be-verified device determined based on the LBS and location information of the historical device determined based on the LBS in the historical feature information. If the location information does not match each other (for example, a location of the to-be-verified device does not appear in the historical feature information), it may be considered that the to-be-verified device is more likely to be incredible.

Optionally, when the identity verification system determines the credibility of the to-be-verified device according to the historical feature information and the device environment information, if a type of information included in the device environment information of the to-be-verified device does not match a preset information type, the identity verification system may directly determine that the to-be-verified device is incredible. It may be understood that the preset information type may include at least one of an identity ID of a device, and a wireless connection (Wi-Fi), a location-based service LBS, and an Internet Protocol IP address corresponding to the device. In some embodiments, since users may use different types of devices that may be connected to different types of network environments, different preset information types are preset for different network environments according to types of information that the devices can have when being normally connected to a network. In this case, if the device environment information sent by the to-be-verified device to the identity verification system lacks information of the type specified in the preset information type, it may be considered that the to-be-verified device is illegally used, as a result of which device environment information originally required to be reported is shielded to escape from verification by the identity verification system. Therefore, the identity verification system may directly determine that the to-be-verified device is incredible, and then adopts a more strict identity verification policy applicable to a higher risk level for identity verification.

Optionally, the identity verification may determine the credibility of the to-be-verified device according to the historical feature information and the device environment information by using a device verification model. For example, input of the device verification model is a feature vector determined according to the device environment information of the to-be-verified device, and output is a credibility label of the to-be-verified device and a probability that the identity verification request sent by the to-be-verified device is predicted as a credible request. Therefore, an identity verification policy for performing identity verification on the user can be determined on this basis.

A method for constructing and training the device verification model and an implementation process of determining the credibility of the to-be-verified device by using the device verification model are described in detail below by using examples.

S105: Determine, according to the credibility of the to-be-verified device, an identity verification policy for performing identity verification on the user, so as to perform identity verification according to the identity verification policy. For example S105 may include determining, according to the credibility of the computing device, an identity verification policy for performing identity verification on the user, wherein the identity verification policy comprises one or more of: an identity verification information type, an identity verification information amount, and an identity verification threshold range; and performing identity verification on the user according to the identity verification policy.

Optionally, the identity verification policy for performing identity verification on the user may be determined according to the credibility of the to-be-verified device and a correspondence between an identity verification policy and a credibility interval. A risk level matching the identity verification policy is in a negative relationship with a credibility of a user-held device.

During implementation, before step S105 is performed, the correspondence between an identity verification policy and a credibility interval may be preset. Higher device credibility indicates a more credible and reasonable device and a lower risk of allowing the device to log into or access a service system. Therefore, an identity verification policy matching the lower risk level may be adopted for performing identity verification. On the contrary, a lower device credibility indicates a less credible and less reasonable device and a higher risk of allowing the device to log into or access a service system. Therefore, an identity verification policy matching the higher risk level needs to be adopted for performing identity verification.

During determining, according to the credibility of the to-be-verified device, the identity verification policy for performing identity verification on the user, when the credibility of the to-be-verified device falls within a specific credibility interval, an identity verification policy corresponding to the credibility interval may be determined as the identity verification policy for performing identity verification on the user by using the to-be-verified device.

In some embodiments, one or more of: identity verification information, an identity verification information amount, and an identity verification threshold range may vary in different identity verification policies.

For example, when the identity verification policy includes an identity verification information type, a higher security level of the identity verification information type in the identity verification policy is more applicable to lower credibility of the user-held device. Therefore, it may be understood that the security level of the identity verification information type is in a negative relationship with the credibility of the device. The security level of the identity verification information type may be defined according to a plurality of criteria. For example, because biological characteristics such as a fingerprint, a face, irises, and a voiceprint of a user are exclusive and irreproducible, it may be considered that identity verification information comprising the unique biological characteristic information of the user usually has a higher security level than identity verification information such as those in text message verification, password verification, security question verification, etc. For another example, it may be considered that a single-time valid dynamic short text message verification code has a higher security level than identity verification information such as those in a fixed security question. It may be understood that when the credibility of the user-held device is relatively low, identity verification information with a higher security level may be used for performing identity verification to ensure reliability of an identity verification result and security of the service system. When the credibility of the user-held device is relatively high, identity verification information with a lower security level may be used for performing identity verification to satisfy identity verification requirements of the identity verification system.

For another example, when the identity verification policy includes an identity verification information amount, a larger identity verification information amount in the identity verification policy is more applicable to lower credibility of the user-held device. Therefore, it may be understood that the identity verification information amount is in a negative relationship with the credibility of the device. It may be understood that a larger identity verification information amount may indicate identity verification performed on the user from more perspectives and bring a more reliable identity verification result. Optionally, when the user-held device has a relatively low credibility, the identity verification information amount may be increased to perform more comprehensive identity verification on the user and ensure the security of the service system. Optionally, when the user-held device has a relatively high credibility, the identity verification information amount may be reduced (for example, a security verification question number may be reduced) to simplify an identity verification process, improve identity verification efficiency, and increase user experience.

For another example, when the identity verification policy includes an identity verification threshold range, a larger identity verification threshold range in the identity verification policy is more applicable to higher credibility of the user-held device. Therefore, it may be understood that the identity verification threshold range is in a positive relationship with the credibility of the device. Optionally, when the user-held device has a relatively low credibility, more strict identity verification needs to be performed on the user. Therefore, a relatively small identity verification threshold range may be adopted, and identity verification of a user without information falling within the range fails. When the user-held device has a relatively high credibility, more moderate identity verification may be performed on the user. Therefore, a relatively large identity verification threshold range may be adopted, and identity verification information of the user is more likely to fall within the range, facilitating identity verification success of the user and improving user experience.

In a scenario, it is assumed that the identity verification system uses face recognition information as the identity verification information. When the user-held device has a relatively high reliability, a face comparison threshold may be appropriately reduced, that is, a requirement on a degree of matching between face information of the user on which identity verification is performed and face information reserved in the identity verification system may be reduced, facilitating identity verification success of the user in a poor face collection environment such as insufficient light or uneven illumination for performing normal service processing.

Optionally, after the identity verification policy for performing identity verification on the user is determined, during identity verification according to the identity verification policy, an identity verification process, information required for the identity verification, and an identity verification threshold range of the information required for the identity verification may be determined according to the identity verification policy. Then the identity verification system prompts, according to the identity verification process, the to-be-verified device to report the information required for the identity verification. After receiving the prompt from the identity verification system, the to-be-verified device held by the user reports, according to the prompt, the information required for the identity verification. For example, when the information required for the identity verification is received from the to-be-verified device, the identity verification is performed according to the identity verification threshold range of the information required for the identity verification.

The main implementation process of this embodiment of the present application is described above by using examples. It may be understood that, in this embodiment of the present application, after the verification request is received from the to-be-verified device, the verification is not directly performed, but the credibility of the to-be-verified device is determined according to the device environment information of the historical device and the device environment information of the to-be-verified device, and the identity verification policy for performing identity verification on the user is further determined according to the credibility. According to the method in the embodiments of the present application, without awareness of a user, an identity verification policy applicable to a currently held device can be selected for the user according to credibility of the user-held device. Therefore, the embodiments of the present application facilitate improvements in the security and the reliability of identity verification, and can satisfy usage requirements of the user, and improve the user experience.

Figure 2:
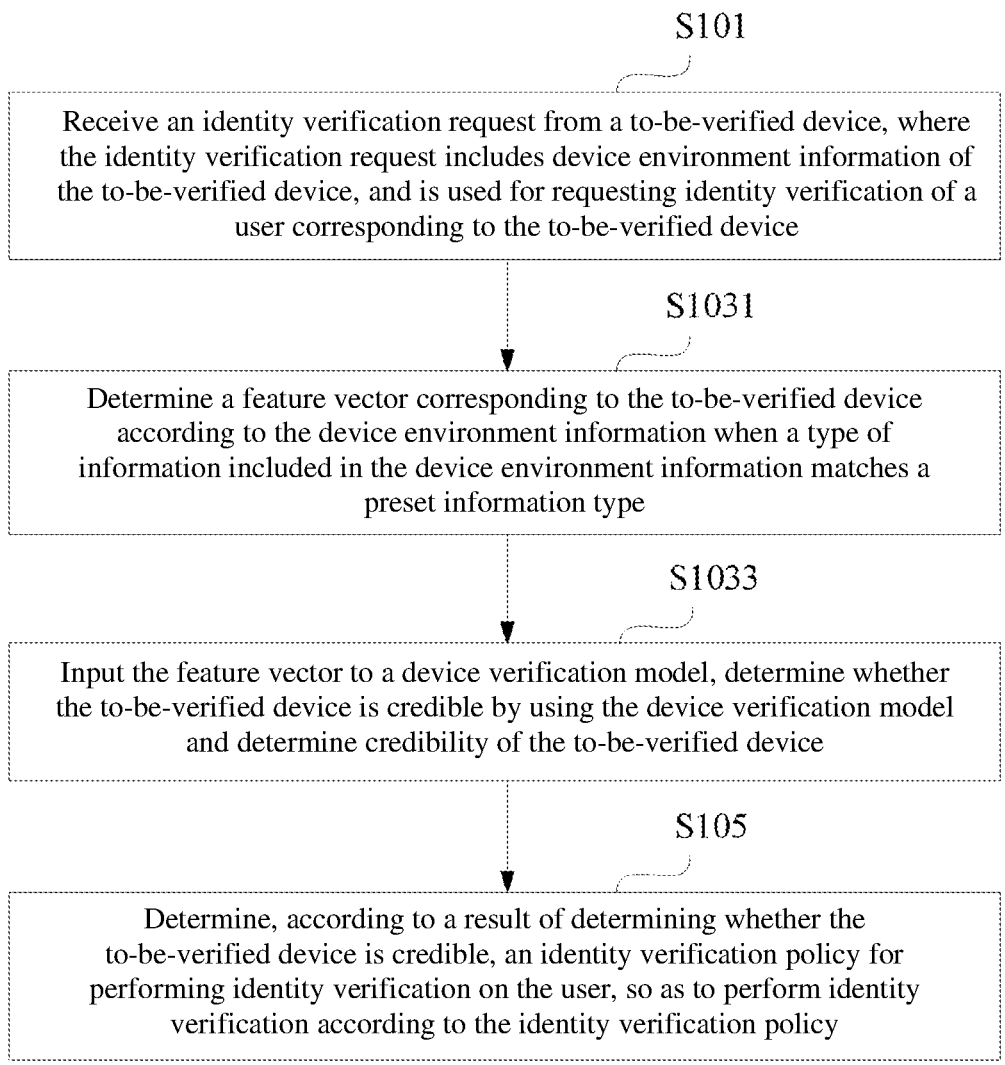
FIG. 2 is a second schematic flowchart of an identity verification method, according to an embodiment of the present application.

An optional manner of performing step S103 of determining the credibility of the to-be-verified device according to the historical feature information and the device environment information is further described below by using examples. For example, referring to FIG. 2, the following steps may be performed.

S1031: Determine a feature vector corresponding to the to-be-verified device according to the device environment information when a type of information included in the device environment information matches a preset information type.

It may be understood that the identity verification system may preset, according to different device types, preset information types for determining the credibility. Optionally, the preset information type may include an identity ID of a device, an IP address on a network to which the device is connected, Wi-Fi, and an LBS. For devices normally connected to a network, complete device environment information needs to include information of all preset information types. If the device environment information received by the identity verification system is missing (in this case, the type of the information included in the device environment information does not match the preset information type), and the identity verification system cannot determine whether the cause is from an objective network environment, or subjective and intentional obstruction or evasion performed by an illegal user, the identity verification system may directly determine that the to-be-verified device is incredible, that is, the credibility of the to-be-verified device is at the lowest level.

When the type of the information included in the device environment information matches the preset information type, the identity verification system may determine the received device environment information as valid information. Therefore, the feature vector corresponding to the to-be-verified device may be determined according to the device environment information on this basis.

The feature vector may be determined according to the device environment information in a plurality of manners. Optionally, the feature vector may be determined according to the device environment information of the to-be-verified device and the historical feature information.

For example, it may be determined whether the device environment information of the to-be-verified device is consistent with the device environment information of the historical device, and a determining result is used as one or more components of the feature vector. When there are a plurality of specific contents in the device environment information, each specific content may be compared separately. The comparison process may be understood as determining whether the device environment information of the historical device includes the device environment information of the to-be-verified device, which is equivalent to determining whether the to-be-verified device has participated in the service system or whether the network environment to which the to-be-verified device is connected has been accessed by users with other held devices. In some embodiments, comparison results of all of the contents may be used as different sub-items in the feature vector, or the comparison results may be summarized by using a preset rule to be collectively used as the sub-items in the feature vector. For example, the preset rule may be that when the comparison results of the plurality of contents are all consistent, a value of the component in the feature vector is 1, and when a comparison result of any of the plurality of contents is inconsistent, the value of the component in the feature vector is 0.

For another example, it may be determined whether the device environment information of the to-be-verified device is consistent with device environment information with maximum historical connecting times, and a determining result is used as one or more components of the feature vector. For still another example, the device environment information of the to-be-verified device may be compared to a missing value of the device environment information of the historical device, and one or more components in the feature vector may be determined according to the comparison result. Specific comparison and determining processes and a manner of determining the corresponding component in the feature vector according to the determining result obtained through comparison are similar to those in the foregoing examples, and details are not described herein again.

It may be understood that during determining of the feature vector corresponding to the to-be-verified device, device environment information existing when the user uses the to-be-verified device and device environment information of a device historically used by the user are used for comparison. In many normal cases, the device environment information of the user usually does not change. If the user-held device is unchanged (in this case, the identity ID of the device is unchanged), and network environment information (for example, an LBS) is changed, it may be still possible that the user sends a normal verification request. However, there is still a risk that the device is stolen. However, if the user-held device is changed (in this case, the identity ID of the device is changed), and the network environment information is unchanged, it is very likely that the user initiates the identity verification request with a changed device. If the device environment information (including identification information of the device and the network environment information) corresponding to the user does not match the historical feature information, allowing the to-be-verified device to access the service system brings a greater risk. Therefore, a more strict identity verification policy matching a higher risk may be adopted for performing identity verification on the user.

S1033: Input the feature vector to a device verification model, and determine the credibility of the to-be-verified device by using the device verification model. The device verification model is configured to determine, based on device environment information of a device, a credibility label of a device that sends an identity verification request and a probability that the identity verification request is predicted as a credible request.

After the corresponding feature vector is generated according to the device environment information of the to-be-verified device, the device verification model may be further used to determine the credibility of the to-be-verified device. It may be understood that the credibility of the device may be embodied in a credibility label of the device output by the device verification model and the probability that the identity verification request sent by the device is predicted as a credible request. In some embodiments, determining of the identity verification policy according to the credibility of the to-be-verified device may be embodied as follows: determining a credibility interval within which the credibility label and/or the probability that the identity verification request is predicted as a credible request falls according to the credibility label of the device and the probability that the identity verification request sent by the device is predicted as a credible request, and further determining an identity verification policy corresponding to the credibility interval as the identity verification policy for the user applying for identity verification with the held to-be-verified device.

Figure 3:
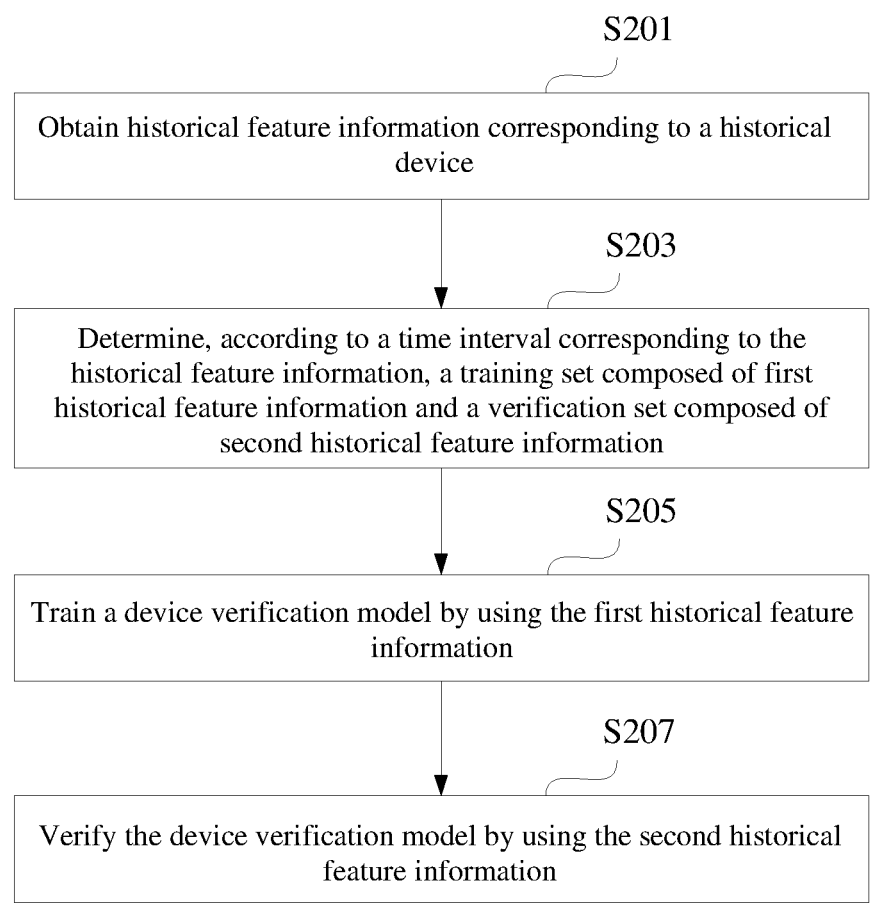
FIG. 3 is a third schematic flowchart of an identity verification method, according to an embodiment of the present application.

Optionally, the device verification model may be established and trained offline by using a machine learning algorithm. For example, referring to FIG. 3, before the feature vector is input to the device verification model and the credibility of the to-be-verified is determined by using the device verification model, the following steps may be performed to complete the training and verification of the device verification model.

S201: Obtain historical feature information corresponding to the historical device.

Figure 4:
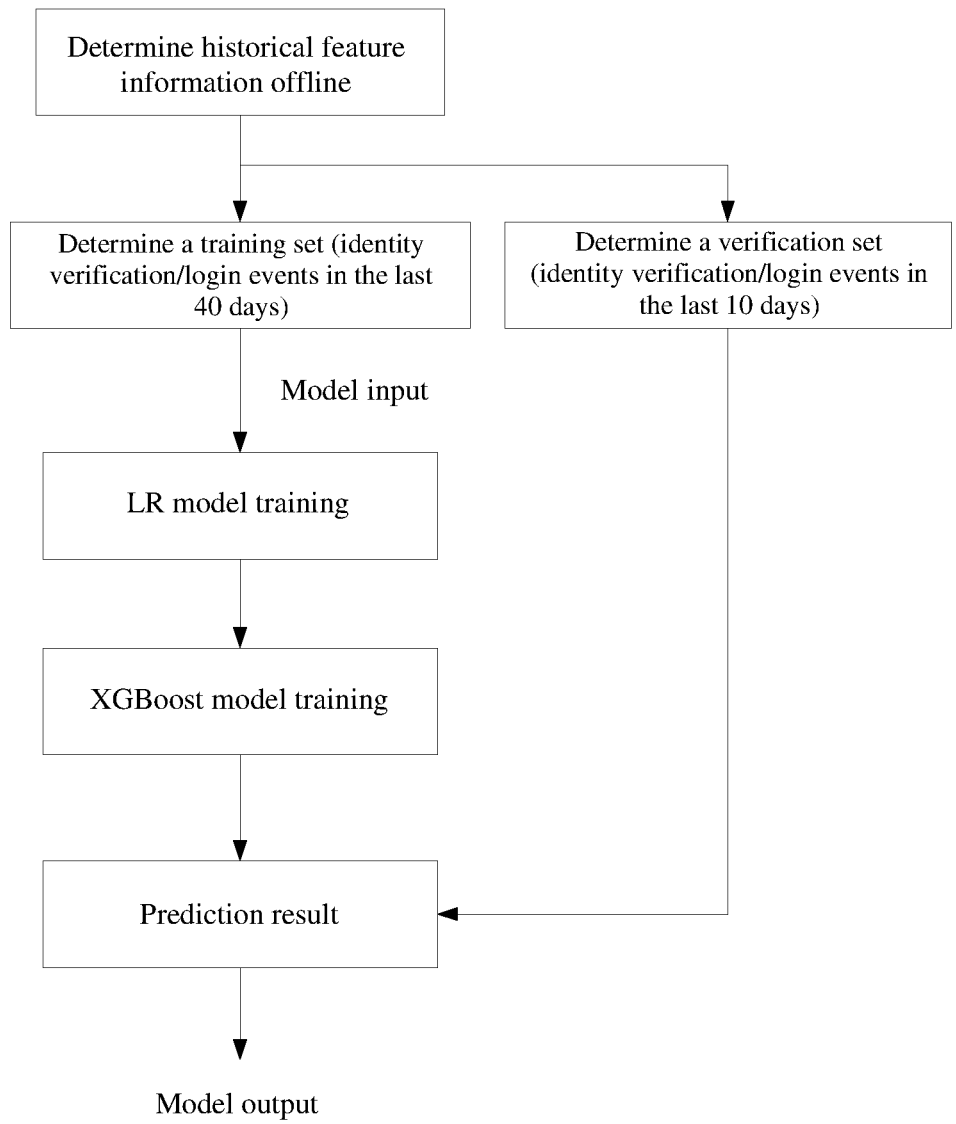
FIG. 4 is a fourth schematic flowchart of an identity verification method, according to an embodiment of the present application.

Referring to FIG. 4, it may be understood that the historical feature information obtained by performing step S201 may be offline historical feature information corresponding to the historical device. The historical device may be either a historical login device logged into the service system (historical login information in historical feature information generated by the historical login device) or a historical identity verification device that undergoes identity verification (including successful identity verification and unsuccessful identity verification) and that performs service processing in the service system (historical identity verification information in historical feature information generated by the historical identity verification device).

In some embodiments, during training of the device verification model, device verification models suitable for different users may be trained according to different contents of the historical feature information. For a user using the service system for the first time, since the user merely logs into the system, the historical feature information may include only device environment information of a historical login device (which may be referred to as historical login information in short) without device environment information of a historical identity verification device. Therefore, for a device verification model suitable for such users, an input parameter of the device verification model is determined with reference to only the historical login information in the historical feature information. For a user who underwent identity verification, since the user performed an identity verification operation, or even performed a service operation in the service system, the historical feature information may include both historical login information and historical identity verification information. Therefore, for a device verification model suitable for such users, an input parameter of the device verification model may be determined with reference to both the historical login information and the historical core body information.

S203: Determine, according to a time interval corresponding to the historical feature information, a training set comprising first historical feature information and a verification set comprising second historical feature information.

Optionally, according to the time interval corresponding to the historical feature information, first historical feature information generated at an earlier moment may be assigned to the training set, and second historical feature information generated at a later moment may be assigned to the verification set. Since the historical feature information in the verification set is generated at a later moment, the historical feature information more satisfies current application requirements of the user. Therefore, assigning the historical feature information generated at a later moment to the verification set enables a more accurate determination of whether a verification result output by the device verification model is correct. For example, referring to FIG. 4, historical feature information generated at identity verification/login moments in the last 50 days may be extracted for training the device verification model. Historical feature information generated in the last 10 days is used as the second historical feature information to form the verification set, and the remaining historical feature information generated in the last 40 days is used as the first historical feature information to form the training set.

Optionally, the historical feature information includes network environment information such as an ID, Wi-Fi, an LBS, and IP of the device used by the user for login/identity verification. The historical feature information may further reflect an application scenario corresponding to the identity verification request initiated by the user, for example, logging into the service system, secondary verification of online payment, or modification of a payment password, etc. The historical feature information may further reflect a corresponding identity verification information type in the identity verification policy determined according to the credibility of the device, for example, face verification, fingerprint verification, or text message verification code verification, etc. The historical feature information may further reflect a verification result corresponding to a login/identity verification event.

S205: Train the device verification model by using the first historical feature information.

Optionally, the established device verification model may include a logistic regression (LR) model and an extreme gradient boosting XGBoost model. The training of the device verification model by using the first historical feature information generally includes two parts: first-stage LR model training and second-stage XGBoost model training. Input of the XGBoost model includes output of the LR model. Referring to FIG. 4, the entire training process of the device verification model is performed in series.

Figure 5:
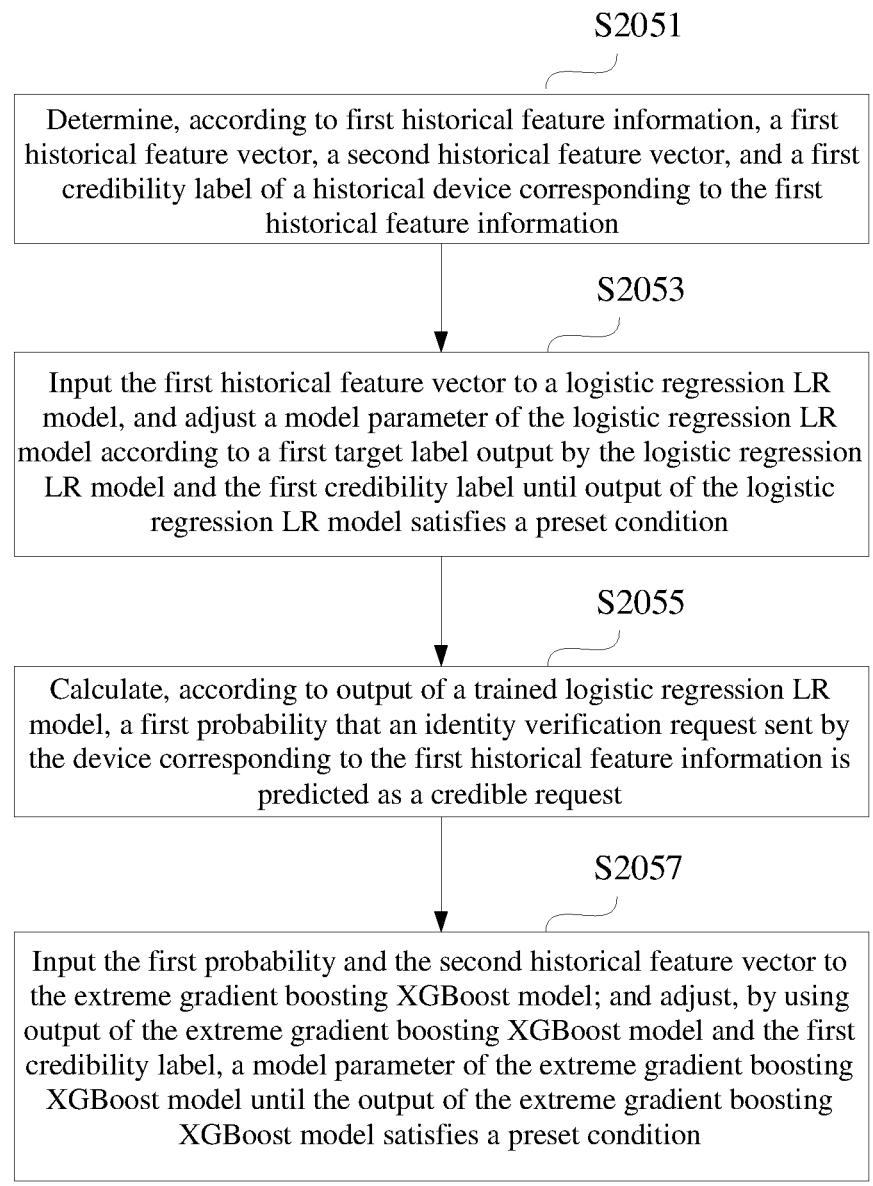
FIG. 5 is a fifth schematic flowchart of an identity verification method, according to an embodiment of the present application.

For example, referring to FIG. 4 and FIG. 5, the training of the device verification model may include the following steps.

S2051: Determine, according to the first historical feature information, a first historical feature vector, a second historical feature vector, and a first credibility label of a historical device corresponding to the first historical feature information.

Optionally, the credibility label of the device corresponding to the historical feature information may be, for example, a black sample and a white sample. It may be determined according to a status of a historical case, whether a historical identity identification request is allowed or refused, or an illegal operation on the service system when identity verification succeeds, etc. whether the credibility label is a black sample or a white sample.

For example, according to the status of the historical case, if a device is involved in a plurality of cases or a case with a relatively large amount of money, a credibility label of the device may be marked as a black sample. An identity verification request corresponding to historical feature information corresponding to the device may also be marked as an incredible request. The case herein may mean that an illegal user uses the device to enter an account of a legal user and illegally obtains money in the account of the legal user, etc.

For another example, if a historical identity verification request sent by a historical device is refused a plurality of times, it indicates that the device is likely to be illegally used. In this case, a credibility label of the device may be marked as a black sample, and an identity verification request corresponding to historical feature information corresponding to the device may also be marked as an incredible request.

For another example, if identity verification succeeds but a user performs an illegal service operation on the service system by using a device, a credibility label of the device may be marked as a black sample. An identity verification request corresponding to historical feature information corresponding to the device may also be marked as an incredible request.

It may be understood that the definition of and a method for determining a credibility label of a device is not limited to the above examples. According to specific application requirements, different meanings may be given to a credibility label, and the credibility label may be determined by using different methods. No limitation is imposed on this in this embodiment of the present application.

Optionally, for determining the feature vector based on the historical feature information, during training of the device verification model, offline statistics may be performed by using offline historical feature information to obtain the feature vector. Specifically, accumulative calculation of feature vectors may be performed according to different time windows and different user principals (which may be distinguished by using user identifiers). Optionally, historical behaviors may be accumulated in different perspectives such as a time window, a device identifier, a user identity, and a combination thereof, and a corresponding component in the feature vector may be determined according to an accumulated value. Alternatively, for each piece of historical feature information, it is determined whether current device environment information is consistent with environment information for a historical device, whether the current device environment information is consistent with the device environment information with maximum times of historical successful logins and/or successful identity verification, and the corresponding component in the feature vector is determined according to a determining result. The corresponding component in the feature vector may also be determined according to a number of factors, such as a comparison result of missing values of the current device environment information and the historical environment information, and a change in the device environment information in a preset number of recent days, etc.

Optionally, for determining the feature vector based on the historical feature information, during a usage phase of the device verification model, online real-time statistics may be determined by using real-time device environment information to obtain the feature vector, so as to monitor output of the device verification model in real time and evaluate the device verification model. When evaluation data of the device verification model does not meet a preset condition, the device verification model may be updated, that is, updated historical feature information is used as the training set and the verification set to retrain the device verification model.

In some embodiments, a number of components in the feature vector may be determined according to actual requirements of the identity verification system and the service system. Optionally, a number of components in the first historical feature vector input to the logistic regression LR model may be greater than a number of components in the second historical feature vector input to the extreme gradient boosting XGBoost model. For example, the first historical feature vector extracted from the historical feature information may have about 300 components, which are input to the logistic regression LR model. For the second historical feature vector extracted from the historical feature information, weights of components in the feature vector may be considered, and features that can be used to distinguish between black and white samples may be further determined based on historical experience, so that more than 30 components may be selected from more than 300 components as the components of the second historical feature vector.

In some embodiments, for a device verification model applicable to a user using the service system for the first time, historical feature information used during training includes only device environment information of a historical login device (which may be referred to as historical login information in short) without device environment information of a historical identity verification device (which may be referred to as historical identity verification information for short). Correspondingly, the feature vector input into the model also includes only a component reflecting the historical login information without a component reflecting the historical identity verification information.

For a device verification model applicable to a user who underwent identity verification, historical feature information used during training includes both the historical login information and the historical identity verification information. Therefore, the feature vector input to the model includes both a component reflecting the historical login information and a component reflecting the historical identity verification information.

S2053: Input the first historical feature vector to the logistic regression LR model, and adjust a model parameter of the logistic regression LR model according to the first credibility label and a first target label output by the logistic regression LR model until output of the logistic regression LR model satisfies a preset condition.

Optionally, during training of the logistic regression LR model, one or more of model parameters such as a regularization term, a regularization coefficient, and a maximum iteration number may be adjusted until the output of the logistic regression LR model satisfies the preset condition.

It may be understood that the first historical feature vector is input to the LR model, and the LR model outputs the first target label. The first target label is a credibility label of the device corresponding to the historical feature information in the generated first historical feature vector predicted by the logistic regression LR model. Based on the calibrated first credibility label, it may be determined whether the first target label output by the logistic regression LR model is correct and accurate, and then the model parameter of the logistic regression LR model is adjusted according to a determining result, so that the logistic regression LR model can output a sufficiently accurate target label. In addition, an optimal logistic regression LR model is obtained by adjusting a model parameter such as a regularization term, a maximum iteration number, and a regularization coefficient, etc.

S2055: Calculate, according to output of a trained logistic regression LR model, a first probability that an identity verification request sent by the device corresponding to the first historical feature information is predicted as a credible request.

After the training of the logistic regression LR model is completed, a probability that the identity verification request is predicted as a white sample (that is, the first probability) may be calculated according to output of the logistic regression LR model, which is used as one of input parameters of the extreme gradient boosting XGBoost model for training the extreme gradient boosting XGBoost model, which is shown in FIG. 4.

S2057: Input the first probability and the second historical feature vector to the extreme gradient boosting XGBoost model; and adjust a model parameter of the extreme gradient boosting XGBoost model by using output of the extreme gradient boosting XGBoost model and the first credibility label until the output of the extreme gradient boosting XGBoost model satisfies a preset condition. The output of the extreme gradient boosting XGBoost model includes the credibility label of the historical device corresponding to the first historical feature information and a probability that an identity verification request sent by the historical device is predicted as a credible request.

Optionally, parameter adjustment of the extreme gradient boosting XGBoost mainly involves the adjustment of parameters such as a number of trees and a step size, etc.

It may be understood that the first probability calculated according to the output of the logistic regression LR model is used as one of the input parameters of the extreme gradient boosting XGBoost model, and the second historical feature vector is used as remaining input parameters of the extreme gradient boosting XGBoost model to obtain an output of the extreme gradient boosting XGBoost model, that is, the credibility label of the historical device corresponding to the first historical feature information and a probability that an identity verification request sent by the historical device is predicted as a credible request. The credibility label output by the extreme gradient boosting XGBoost model is compared to the calibrated first credibility label, so that it may be determined whether the credibility label output by the extreme gradient boosting XGBoost model is correct and accurate, and then the model parameter of the extreme gradient boosting XGBoost model of is adjusted, so that the extreme gradient boosting XGBoost model can output a sufficiently correct credibility label. In addition, the number of trees and the step size are adjusted to obtain an optimal extreme gradient boosting XGBoost model.

S207: Verify the device verification model by using the second historical feature information.

It may be understood that the verification of the device verification model may be performed immediately after the training of the device verification model is completed to determine whether accuracy of the output of the device verification model can meet application requirements. In some embodiments, after the device verification model is used for a period of time, an output effect of the device verification model may be regularly or irregularly verified, so that when the output of the device verification model is not sufficiently accurate and cannot meet the application requirements, the device verification model is retrained by using updated historical feature information to meet the application requirements.

Figure 6:
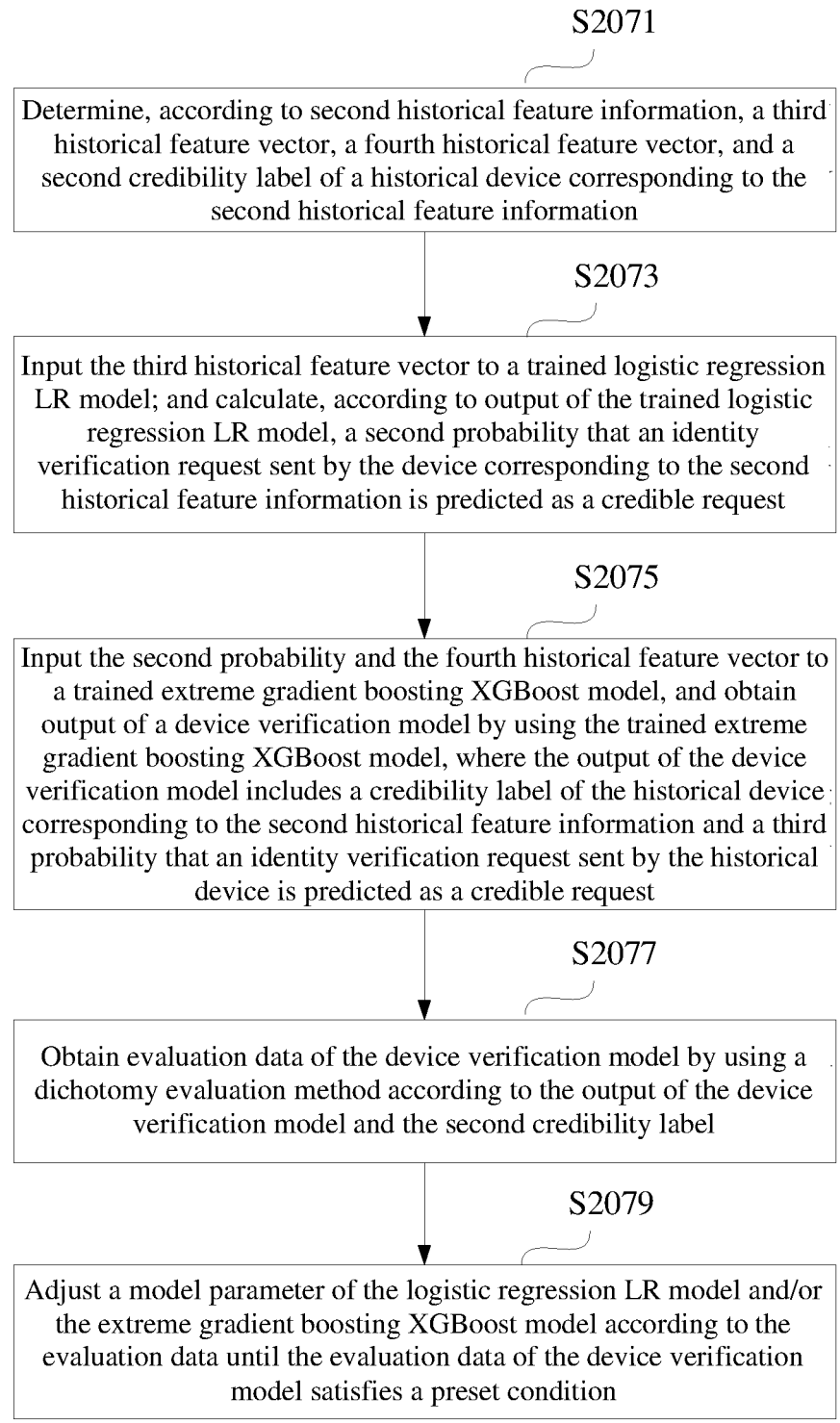
FIG. 6 is a sixth schematic flowchart of an identity verification method according to an embodiment of the present application.

Optionally, referring to FIG. 6, during verification of the device verification model, the following methods may be used.

S2071: Determine, according to the second historical feature information, a third historical feature vector, a fourth historical feature vector, and a second credibility label of a historical device corresponding to the second historical feature information.

S2073: Input the third historical feature vector to the trained logistic regression LR model; and calculate, according to the output of the trained logistic regression LR model, a second probability that an identity verification request sent by the device corresponding to the second historical feature information is predicted as a credible request.

S2075: Input the second probability and the fourth historical feature vector to a trained extreme gradient boosting XGBoost model, and obtaining output of the device verification model by using the trained extreme gradient boosting XGBoost model. The output of the device verification model includes the credibility label of the historical device corresponding to the second historical feature information and a third probability that an identity verification request sent by the historical device is predicted as a credible request.

S2077: Obtain evaluation data of the device verification model by using a binary classification method according to the output of the device verification model and the second credibility label.

S2079: Adjust the model parameter of the logistic regression LR model and/or the extreme gradient boosting XGBoost model according to the evaluation data until the evaluation data of the device verification model satisfies a preset condition.

It may be understood that the second historical feature information in the verification set is used as the input of the device verification model. After processing performed by the logistic regression LR model and the extreme gradient boosting XGBoost model in series in the device verification model, the credibility label of the historical device corresponding to the second historical feature information and the third probability that the identity verification request sent by the historical device is predicted as a credible request are output. Then the evaluation data of the device verification model may be obtained by using a binary classification method according to the calibrated second credibility label.

Optionally, the evaluation data of the device verification model may include at least one of an F1 score and an area under the curve (AUC) value. For example, the F1 score is a parameter index giving comprehensive consideration to model precision and recall. A higher F1 score indicates a more robust classification model (which is specifically the device verification model herein). The area under the curve AUC value is a possibility that a probability that a given positive sample output by the classification module is positive is greater than a probability that a negative sample output by the classification model is positive. The F1 score and the area under the curve AUC value are used for judging training of a model. An effect of predicting the credibility by the model is evaluated by using the evaluation data of the model, and the model parameter of the logistic regression LR model and/or the extreme gradient boosting XGBoost model are/is continuously adjusted, so as to obtain an optimal model combination of the logistic regression LR model and the extreme gradient boosting XGBoost model.

In some embodiments, for the evaluation data of the device verification model, in addition to mathematical parameters of the model, a misjudgment rate of black samples and an accuracy rate of white samples may be further considered with reference to the actual application scenario of the model. If a black sample is determined as a white sample, identity verification of an illegal user succeeds, threatening the security of the service system. If a white sample is determined as a black sample, although the security of the service systems is not affected due to strict identity verification on a legal user, the user experience is affected. Therefore, judgement accuracy and a misjudgment rate of the device verification model also need to be considered. When the accuracy rate decreases and misjudgment rate increases, model update may be triggered, that is, the device verification model is retrained by using the updated historical feature information.

In the embodiments of the present application, after the verification request is received from the to-be-verified device, the verification is not directly performed, but the credibility of the to-be-verified device is determined according to the device environment information of the historical device and the device environment information of the to-be-verified device, and the identity verification policy for performing identity verification on the user is further determined according to the credibility. According to the method in the embodiments of the present application, without awareness of a user, an identity verification policy applicable to a currently held device can be selected for the user according to a credibility of the user-held device. Therefore, the embodiments of the present application facilitate improvements in the security and the reliability of identity verification, and can satisfy usage requirements of the user, and improve the user experience.

Figure 7:
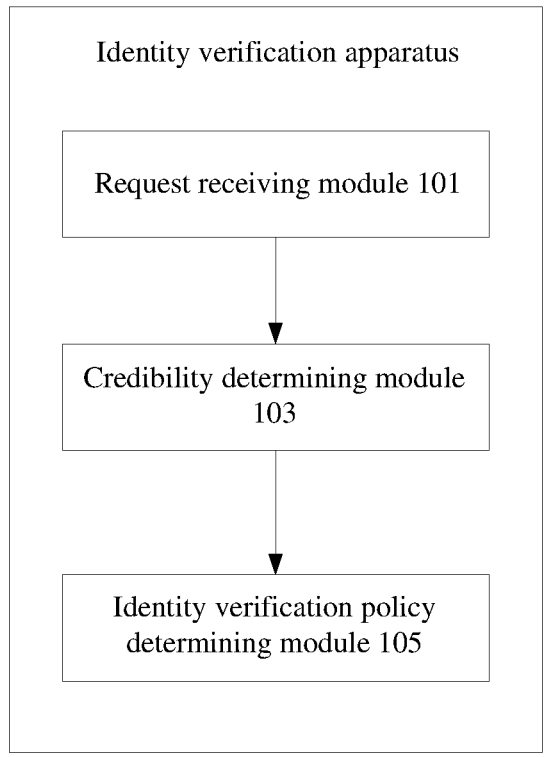
FIG. 7 is a schematic structural diagram of an identity verification apparatus, according to an embodiment of the present application.

An embodiment of the present application further provides an identity verification apparatus applied to an identity verification system. Referring to FIG. 7, the identity verification apparatus may include: a request receiving module 101 configured to receive an identity verification request from a to-be-verified device, where the identity verification request includes device environment information of the to-be-verified device, and is used for requesting identity verification of a user corresponding to the to-be-verified device; a credibility determining module 103 configured to determine credibility of the to-be-verified device according to historical feature information and the device environment information, where the historical feature information includes device environment information of a historical device; and an identity verification policy determining module 105 configured to determine, according to the credibility of the to-be-verified device, an identity verification policy for performing identity verification on the user, so as to perform identity verification according to the identity verification policy.

In some embodiments, the various modules of the identity verification apparatus in FIG. 7 may be implemented as software instructions or a combination of software and hardware. For example, the identity verification apparatus in FIG. 7 (or referred to as a system) may comprise one or more processors (e.g., a CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the identity verification apparatus in FIG. 7 may include a server, a mobile phone, a tablet computer, a PC, a laptop computer, another computing device, or a combination of one or more of these computing devices.

In some embodiments, the identity verification apparatus in FIG. 7 may comprise one or more processors and one or more non-transitory computer-readable storage media storing instructions executable by the one or more processors, wherein execution of the instructions causes the one or more processors to perform operations comprising: receiving from a computing device an identity verification request for identity verification of a user of the computing device for accessing the system, wherein the identity verification request comprises device environment information of the computing device, wherein the device environment information comprises one or more of: identity ID information, and WI-FI information, LBS (location-based service) information, and IP (Internet Protocol IP) address; determining a credibility of the computing device according to (i) the device environment information of the computing device and (ii) historical feature information comprising device environment information of a historical device used by the user, wherein the historical device previously logged into the system or underwent a previous identity verification for accessing the system; determining, according to the credibility of the computing device, an identity verification policy for performing identity verification on the user, wherein the identity verification policy comprises one or more of: an identity verification information type, an identity verification information amount, and an identity verification threshold range; and performing identity verification on the user according to the identity verification policy.

It may be understood that the identity verification apparatus illustrated in FIG. 7 corresponds to the identity verification method performed by the identity verification system provided in the foregoing embodiment, and can implement the identity verification method in the foregoing embodiment. Details are not described herein again.

Figure 8:
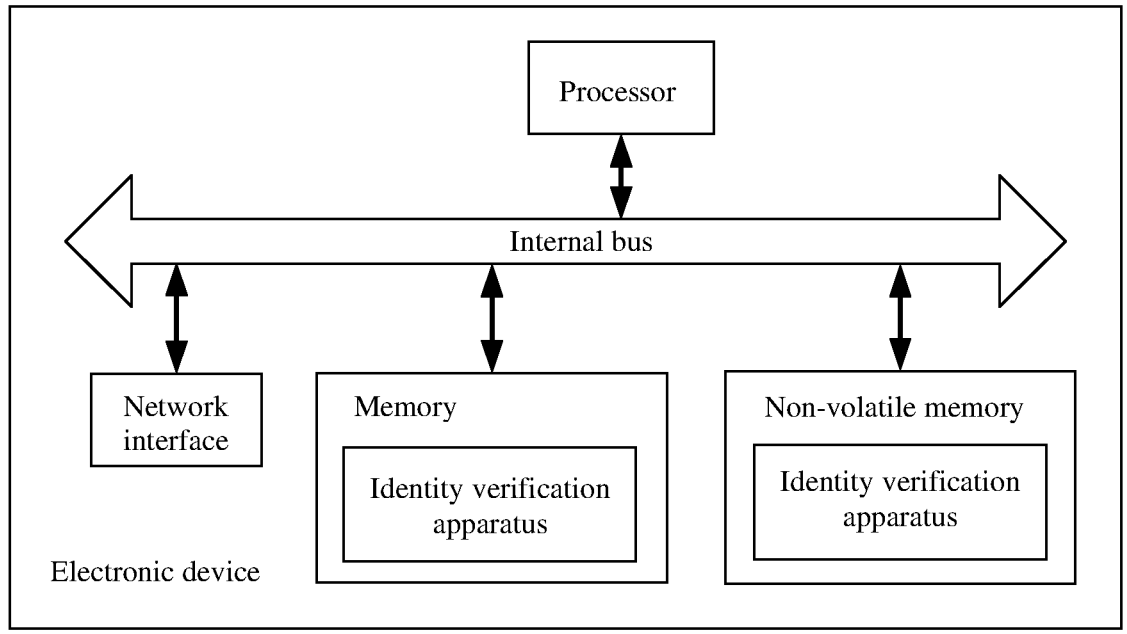
FIG. 8 is a schematic structural diagram of an electronic device, according to an embodiment of the present application.

FIG. 8 is a structural schematic diagram of an electronic device according to an embodiment of the present application. Referring to FIG. 8, on a hardware level, the electronic device includes a processor, and optionally includes an internal bus, a network interface, and a memory, where the memory may include an internal memory, such as a random-access memory (RAM), or may further include a non-volatile memory, such as at least one magnetic-disk memory. Certainly, the electronic device may further include other hardware required by services.

The processor, the network interface, and the memory may be mutually connected through an internal bus, and the internal bus may be an industry standard architecture (ISA) bus, a peripheral component interconnect (PCI) bus, or an extended industry standard architecture (EISA) bus. The bus may be divided into an address bus, a data bus, and a control bus. For ease of representation, only one thick line is used to represent the bus in FIG. 8, but this does not mean that there is only one bus or only one type of bus.

The memory is configured to store a program. For example, the program may include program code, the program code include computer executable instructions. The memory may include an internal memory and a non-volatile memory, and provide instructions and data for the processor.

The processor reads a corresponding computer program from the non-volatile storage into the internal memory and then runs the computer program, to form an identity verification apparatus. The processor executes the program stored in the memory, and the program is used for performing the following operations: receiving an identity verification request from a to-be-verified device, where the identity verification request includes device environment information of the to-be-verified device, and is used for requesting identity verification of a user corresponding to the to-be-verified device; determining a credibility of the to-be-verified device according to historical feature information and the device environment information, where the historical feature information includes device environment information of a historical device; and determining, according to the credibility of the to-be-verified device, an identity verification policy for performing identity verification on the user, so as to perform identity verification according to the identity verification policy.

The foregoing method performed by the identity verification apparatus disclosed in the embodiment shown in FIG. 1 of the present application may be applied to a processor, or may be implemented by a processor. The processor may be an integrated circuit chip and has a signal processing capability. In an implementation process, steps of the foregoing method may be implemented by using a hardware integrated logic circuit in the processor or instructions in a form of software. The processor may be a general processor, including a central processing unit (Central Processing Unit, CPU), a network processor (Network Processor, NP), and the like; or may further be a digital signal processor (Digital Signal Processing, DSP), an application-specific integrated circuit (Application-Specific Integrated Circuit, ASIC), a field programmable gate array (Field-Programmable Gate Array, FPGA), or another programmable logical device, discrete gate or transistor logical device, or discrete hardware component. The processor may implement or perform the methods, the steps, and logical block diagrams that are disclosed in the embodiments of the present application. The general-purpose processor may be a microprocessor, or the processor may further be any conventional processor, or the like. Steps of the methods disclosed with reference to the embodiments of the present application may be directly performed and completed by using a hardware decoding processor, or may be performed and completed by using a combination of hardware and software modules in the decoding processor. The software module may be located in a mature storage medium in the field, such as a random-access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

The electronic device may further perform the method performed by the identity verification apparatus in FIG. 1, and implement the function of the identity verification apparatus shown in the embodiment of FIG. 1. This is not repeated herein in the embodiment of the present application.

An embodiment of the present application further provides a computer readable storage medium. The computer readable storage medium stores one or more programs, the one or more programs include an instruction, and when the instruction is executed by an electronic device including a plurality of applications, the electronic device is enabled to perform the method performed by the identity verification apparatus in the embodiment shown in FIG. 1, and is specifically configured to perform the following steps: receiving an identity verification request from a to-be-verified device, where the identity verification request includes device environment information of the to-be-verified device, and is used for requesting identity verification of a user corresponding to the to-be-verified device; determining a credibility of the to-be-verified device according to historical feature information and the device environment information, where the historical feature information includes device environment information of a historical device; and determining, according to the credibility of the to-be-verified device, an identity verification policy for performing identity verification on the user, so as to perform identity verification according to the identity verification policy.

A person skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPU), an input/output interface, a network interface, and an internal memory.

The internal memory may include a form such as a volatile memory, a random access memory (RAM), and/or a non-volatile memory in a computer readable medium, for example, a read-only memory (ROM) or a flash memory (flash RAM). The internal memory is an example of the computer readable medium.

The computer-readable medium includes persistent, non-persistent, movable, and unmovable media that may implement information storage by using any method or technology. The information may be a computer readable instruction, a data structure, a program module or other data. An example of a computer storage medium includes, but is not limited to, a phase-change memory (PRAM), a static random access memory (SRAM), a dynamic random access memory (DRAM), another type of RAM, a ROM, an electrically erasable programmable read-only memory (EEPROM), a flash memory or another memory technology, a CD-ROM, a digital versatile disc (DVD) or another optical memory, a cassette, a magnetic tape, a magnetic disk memory or another magnetic storage device, or any other non-transmission medium, and may be used to store information accessible by the computing device. Based on the definition in the present disclosure, the computer-readable medium does not include transitory computer readable media (transitory media), such as a modulated data signal and a carrier.

It should also be noted that the terms "include," "comprise," and any other variants mean to cover the non-exclusive inclusion. Thereby, the process, method, article, or device which include a series of elements not only include those elements, but also include other elements which are not clearly listed, or include the inherent elements of the process, method, article and device. Unless otherwise specified, an element limited by "include a/an . . . " does not exclude other same elements existing in the process, the method, the article, or the device that includes the element.

A person skilled in the art should understand that the embodiments of the application may be provided as a method, a system, or a computer program product. Therefore, the present application may use a form of total hardware embodiments, total software embodiments, or embodiments combining software and hardware. In addition, the present application may use a form of a computer program product that is implemented on one or more computer-usable storage media (including but not limited to a disk memory, a CD-ROM, an optical memory, and the like) that include computer-usable program code.

The foregoing descriptions are merely embodiments of the present application and are not intended to limit the present application. For a person skilled in the art, various modifications and variations can be made to the present application. Any modification, equivalent replacement, improvement and the like made within the spirit and principle of the present application should fall within the protection scope of the present application.

What is claimed is:

1. An identity verification method, comprising:
   receiving from a computing device an identity verification request for identity verification of a user of the computing device for accessing a service system, wherein the identity verification request comprises device environment information of the computing device, wherein the device environment information comprises one or more of: identity ID information, and WI-FI information, LBS (location-based service) information, and IP (Internet Protocol IP) address;
   obtaining historical feature information comprising device environment information of a historical device used by the user, wherein the historical device previously logged into the service system or underwent a previous identity verification for accessing the service system;
   training a device verification model based on the historical feature information by:

determining, according to first historical feature information, a first historical feature vector, a second historical feature vector, and a first credibility label of a device corresponding to the first historical feature information, wherein the device verification model comprises an LR (logistic regression) model and an XGBoost (extreme gradient boosting) model;

inputting the first historical feature vector to the LR model;

obtaining a trained LR model by adjusting a model parameter of the LR model according to the first credibility label and a first target label output by the LR model;

determining, according to an output of the trained LR model, a first probability that an identity verification request sent by the device corresponding to the first historical feature information is a credible request;

inputting the first probability and the second historical feature vector to the XGBoost model; and obtaining a trained XGBoost model by adjusting a model parameter of the XGBoost model based on an output of the XGBoost model and the first credibility label, wherein the output of the XGBoost model comprises the first credibility label of the historical device corresponding to the first historical feature information and a probability that an identity verification request sent by the historical device corresponding to the first historical feature information is a credible request;

determining a feature vector corresponding to the computing device according to the device environment information of the computing device when a type of information comprised in the device environment information matches a preset information type;

outputting, from the device verification model based on the feature vector corresponding to the computing device, a credibility of the computing device;

determining, according to the credibility of the computing device, an identity verification policy for performing identity verification on the user, wherein the identity verification policy comprises one or more of: an identity verification information type, an identity verification information amount, and an identity verification threshold range; and performing identity verification on the user according to the identity verification policy.

2. The method according to claim 1, wherein determining the credibility of the computing device comprises:

inputting the feature vector to a into the device verification model; and outputting, from the device verification model based on the feature vector corresponding to the computing device, a probability that the identity verification request is a credible request.

3. The method according to claim 2, wherein before inputting the feature vector to the device verification model, the method further comprises:

determining, according to a time interval corresponding to the historical feature information, a training set comprising the first historical feature information and a verification set comprising second historical feature information; and verifying the device verification model by using the second historical feature information.

4. The method according to claim 3, wherein determining, according to the time interval corresponding to the historical feature information, the training set comprising the first historical feature information and the verification set comprising the second historical feature information comprises:

according to the time interval corresponding to the historical feature information, assigning the first historical feature information generated at a first time point to the training set, and assigning the second historical feature information generated at a second time point to the verification set, wherein the first time point is earlier in time than the second time point.

5. The method according to claim 3, wherein verifying the device verification model by using the second historical feature information comprises:

determining, according to the second historical feature information, a third historical feature vector, a fourth historical feature vector, and a second credibility label of a historical device corresponding to the second historical feature information;

inputting the third historical feature vector to the trained LR model;

determining, according to the output of the trained LR model, a second probability that an identity verification request sent by the device corresponding to the second historical feature information is a credible request;

inputting the second probability and the fourth historical feature vector to the trained XGBoost model, and obtaining an output of the device verification model by using the trained XGBoost model, wherein the output of the device verification model comprises the second credibility label of the historical device corresponding to the second historical feature information and a third probability that an identity verification request sent by the historical device is a credible request;

obtaining evaluation data of the device verification model by using a binary classification method according to the output of the device verification model and the second credibility label; and adjusting the model parameter of the LR model and/or the model parameter of the XGBoost model according to the evaluation data until the evaluation data of the device verification model satisfies a preset condition.

6. The method according to claim 5, wherein the evaluation data of the device verification model comprises at least one of an F1 score and an AUC (area under the curve) value.

7. The method according to claim 1, wherein the model parameter of the LR model comprises at least one of: a regularization term, a regularization coefficient, and a maximum iteration number.

8. The method according to claim 1, wherein a number of components in the first historical feature vector is greater than a number of components in the second historical feature vector.

9. The method according to claim 2, wherein determining the credibility of the computing device comprises:

determining that the computing device is incredible when the type of the information comprised in the device environment information does not match the preset information type.

10. The method according to claim 9, wherein the preset information type comprises at least one of: an identity ID of a device, and a WI-FI connection, an LBS (location-based service), and an IP (Internet Protocol) address corresponding to the device.

11. The method according to claim 1, wherein the historical device comprises at least one of: a historical login device and a historical identity verification device.

12. The method according to claim 1, wherein determining, according to the credibility of the computing device, the identity verification policy comprises:
   determining, according to the credibility of the computing device and a correspondence between the identity verification policy and a credibility interval, the identity verification policy, wherein:
   a risk level matching the identity verification policy is in a negative relationship with the credibility of the computing device.

13. The method according to claim 12, wherein:
   when the identity verification policy comprises the identity verification information type, a security level of the identity verification information type in the identity verification policy is in a negative relationship with the credibility of the computing device;
   when the identity verification policy comprises the identity verification information amount, the identity verification information amount in the identity verification policy is in a negative relationship with the credibility of the computing device; and
   when the identity verification policy comprises the identity verification threshold range, the identity verification threshold range in the identity verification policy is in a positive relationship with the credibility of the computing device.

14. The method according to claim 1, wherein performing the identity verification on the user according to the identity verification policy comprises:
   determining, according to the identity verification policy, an identity verification process, information required for the identity verification, and an identity verification threshold range of the information required for the identity verification;
   prompting, according to the identity verification process, the computing device to report the information required for the identity verification;
   receiving the information required for the identity verification from the computing device; and
   performing the identity verification according to the identity verification threshold range of the information required for the identity verification.

15. A non-transitory computer-readable storage medium storing instructions executable by one or more processors, wherein execution of the instructions causes the one or more processors to perform operations comprising:
   receiving from a computing device an identity verification request for identity verification of a user of the computing device for accessing a service system, wherein the identity verification request comprises device environment information of the computing device, wherein the device environment information comprises one or more of: identity ID information, and WI-FI information, LBS (location-based service) information, and IP (Internet Protocol IP) address;
   obtaining historical feature information comprising device environment information of a historical device used by the user, wherein the historical device previously logged into the service system or underwent a previous identity verification for accessing the service system;
   training a device verification model based on the historical feature information by:
      determining, according to first historical feature information, a first historical feature vector, a second historical feature vector, and a first credibility label of a device corresponding to the first historical feature information, wherein the device verification model comprises an LR (logistic regression) model and an XGBoost (extreme gradient boosting) model;
      inputting the first historical feature vector to the LR model;
      obtaining a trained LR model by adjusting a model parameter of the LR model according to the first credibility label and a first target label output by the LR model;
      determining, according to an output of the trained LR model, a first probability that an identity verification request sent by the device corresponding to the first historical feature information is a credible request;
      inputting the first probability and the second historical feature vector to the XGBoost model; and
      obtaining a trained XGBoost model by adjusting a model parameter of the XGBoost model based on an output of the XGBoost model and the first credibility label, wherein the output of the XGBoost model comprises the first credibility label of the historical device corresponding to the first historical feature information and a probability that an identity verification request sent by the historical device corresponding to the first historical feature information is a credible request;
   determining a feature vector corresponding to the computing device according to the device environment information of the computing device when a type of information comprised in the device environment information matches a preset information type;
   outputting, from the device verification model based on the feature vector corresponding to the computing device, a credibility of the computing device;
   determining, according to the credibility of the computing device, an identity verification policy for performing identity verification on the user, wherein the identity verification policy comprises one or more of: an identity verification information type, an identity verification information amount, and an identity verification threshold range; and
   performing identity verification on the user according to the identity verification policy.

16. The storage medium of claim 15, wherein determining the credibility of the computing device comprises:
   inputting the feature vector to a device verification model; and
   outputting, from the device verification model based on the feature vector corresponding to the computing device, a probability that the identity verification request is a credible request.

17. The storage medium of claim 16, wherein before inputting the feature vector to the device verification model, the operations further comprise:
   determining, according to a time interval corresponding to the historical feature information, a training set comprising the first historical feature information and a verification set comprising second historical feature information; and
   verifying the device verification model by using the second historical feature information.

18. The storage medium of claim 17, wherein determining, according to the time interval corresponding to the historical feature information, the training set comprising the first historical feature information and the verification set comprising the second historical feature information comprises:

according to the time interval corresponding to the historical feature information, assigning the first historical feature information generated at a first time point to the training set, and assigning the second historical feature information generated at a second time point to the verification set, wherein the first time point is earlier in time than the second time point.

19. A system, comprising one or more processors and one or more non-transitory computer-readable storage media storing instructions executable by the one or more processors, wherein execution of the instructions causes the one or more processors to perform operations comprising:

receiving from a computing device an identity verification request for identity verification of a user of the computing device for accessing the system, wherein the identity verification request comprises device environment information of the computing device, wherein the device environment information comprises one or more of: identity ID information, and WI-FI information, LBS (location-based service) information, and IP (Internet Protocol IP) address;

obtaining historical feature information comprising device environment information of a historical device used by the user, wherein the historical device previously logged into the service system or underwent a previous identity verification for accessing the service system;

training a device verification model based on the historical feature information by:

determining, according to first historical feature information, a first historical feature vector, a second historical feature vector, and a first credibility label of a device corresponding to the first historical feature information, wherein the device verification model comprises an LR (logistic regression) model and an XGBoost (extreme gradient boosting) model;

inputting the first historical feature vector to the LR model;

obtaining a trained LR model by adjusting a model parameter of the LR model according to the first credibility label and a first target label output by the LR model;

determining, according to an output of the trained LR model, a first probability that an identity verification request sent by the device corresponding to the first historical feature information is a credible request;

inputting the first probability and the second historical feature vector to the XGBoost model; and obtaining a trained XGBoost model by adjusting a model parameter of the XGBoost model based on an output of the XGBoost model and the first credibility label, wherein the output of the XGBoost model comprises the first credibility label of the historical device corresponding to the first historical feature information and a probability that an identity verification request sent by the historical device corresponding to the first historical feature information is a credible request;

determining a feature vector corresponding to the computing device according to the device environment information of the computing device when a type of information comprised in the device environment information matches a preset information type;

outputting, from the device verification model based on the feature vector corresponding to the computing device, a credibility of the computing device;

determining, according to the credibility of the computing device, an identity verification policy for performing identity verification on the user, wherein the identity verification policy comprises one or more of: an identity verification information type, an identity verification information amount, and an identity verification threshold range; and performing identity verification on the user according to the identity verification policy.

* * * * *

UNITED STATES PATENT AND TRADEMARK OFFICE
CERTIFICATE OF CORRECTION

PATENT NO. : 10,938,812 B2
APPLICATION NO. : 16/884526
DATED : March 2, 2021
INVENTOR(S) : Wei Wang et al.

Page 1 of 1

It is certified that error appears in the above-identified patent and that said Letters Patent is hereby corrected as shown below:

In the Claims
Claim 2, Column 29, Line 49:
"vector to a into" should read -- vector into --.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*